(12) United States Patent
Mascre et al.

(10) Patent No.: US 11,172,247 B2
(45) Date of Patent: Nov. 9, 2021

(54) METHOD TO CHANGE THE SERVICE OF A DIGITAL TELEVISION DECODER EQUIPPED WITH A PLURALITY OF TUNERS

(71) Applicant: SAGEMCOM BROADBAND SAS, Rueil Malmaison (FR)

(72) Inventors: Rémi Mascre, Rueil Malmaison (FR); Jérôme Berger, Rueil Malmaison (FR)

(73) Assignee: SAGEMCOM BROADBAND SAS, Rueil Malmaison (FR)

(*) Notice: Subject to any disclaimer, the term of this patent is extended or adjusted under 35 U.S.C. 154(b) by 516 days.

(21) Appl. No.: 15/780,757

(22) PCT Filed: Dec. 2, 2016

(86) PCT No.: PCT/EP2016/079539
§ 371 (c)(1),
(2) Date: Jun. 1, 2018

(87) PCT Pub. No.: WO2017/093456
PCT Pub. Date: Jun. 8, 2017

(65) Prior Publication Data
US 2020/0252675 A1    Aug. 6, 2020

(30) Foreign Application Priority Data
Dec. 4, 2015  (FR) ...................................... 1561835

(51) Int. Cl.
*H04N 21/426* (2011.01)
*H04N 5/372* (2011.01)
(Continued)

(52) U.S. Cl.
CPC ......... *H04N 21/4263* (2013.01); *H04N 5/372* (2013.01); *H04N 5/9201* (2013.01); *H04N 21/4384* (2013.01)

(58) Field of Classification Search
CPC .................................................. H04N 21/4263
See application file for complete search history.

(56) References Cited

U.S. PATENT DOCUMENTS

| 2005/0094733 A1* | 5/2005 | Daniell | H04N 21/4384 |
| | | | 375/240.25 |
| 2010/0118973 A1* | 5/2010 | Rodriguez | H04N 19/895 |
| | | | 375/240.25 |
| 2014/0198254 A1* | 7/2014 | Boss | H04N 5/50 |
| | | | 348/570 |

FOREIGN PATENT DOCUMENTS

EP    1 487 200 A1    12/2004

OTHER PUBLICATIONS

International Search Report as issued in International Patent Application No. PCT/EP2016/079539, dated Feb. 2, 2017.

* cited by examiner

*Primary Examiner* — John W Miller
*Assistant Examiner* — Justin B Sanders
(74) *Attorney, Agent, or Firm* — Pillsbury Winthrop Shaw Pittman LLP

(57) ABSTRACT

A method for changing service within a digital television decoder, the digital decoder including a plurality of tuners, each tuner being capable of receiving a stream of signals including data relating to television services, the method including configuring each tuner for receiving a particular service; restoring, on a screen, a first service corresponding to the service for the reception of which a first tuner has been configured; receiving, via the decoder, a first change of service command with a view to displaying a second service for the reception of which a second tuner has been configured; receiving, via the decoder, a second change of service command with a view to displaying a third service for the reception of which a third tuner has been configured; apply- (Continued)

ing a forced delay before displaying the second service and/or the third service.

12 Claims, 2 Drawing Sheets

(51) Int. Cl.
*H04N 5/92* (2006.01)
*H04N 21/438* (2011.01)

Fig. 1

| Period | State/Action | Tuner 1 | Tuner 2 | Tuner 3 | Tuner 4 |
|---|---|---|---|---|---|
| | | 103 | 104 | 105 | 106 |
| | Initial state → 3 | Ready, channel 1 | Display, channel 2 | Ready, channel 3 | Ready, channel 4 |
| 100ms | Display channel 3→4 | Prep, channel 5 | Ready, channel 2 | Display, channel 3 | Ready, channel 4 |
| 100ms | Display channel 4→5 | Prep, channel 5 | Prep, channel 6 | Display, channel 3 | Ready, channel 4 |
| | Waiting | Prep, channel 5 | Prep, channel 6 | Prep, channel 7 | Ready, channel 4 |
| 2.8 s | Display channel 5→6 | Display, channel 5 | Prep, channel 6 | Prep, channel 7 | Ready, channel 4 |
| 100ms | Display channel 6→7 | Ready, channel 5 | Display, channel 6 | Prep, channel 7 | Prep, channel 8 |
| 100ms | Waiting | Prep, channel 9 | Ready, channel 6 | Display, channel 7 | Prep, channel 8 |
| | Display channel 7→8 | Prep, channel 9 | Prep, channel 10 | Ready, channel 7 | Display, channel 8 |
| 2.8 s | Display channel 8→9 | | | | |
| etc. | | | | | |

Fig. 2

| Period | State/Action | Tuner 1 | Tuner 2 | Tuner 3 | Tuner 4 |
|---|---|---|---|---|---|
| | | 103 | 104 | 105 | 106 |
| | Initial state → 3 | Ready, channel 1 | Display, channel 2 | Ready, channel 3 | Ready, channel 4 |
| 1 s | Forced wait | Prep, channel 5 | Ready, channel 2 | Ready, channel 3 | Ready, channel 4 |
| 1 s | Display channel 3→4 | Prep, channel 5 | Prep, channel 6 | Display, channel 3 | Ready, channel 4 |
| 1 s | Forced wait | Prep, channel 5 | Prep, channel 6 | Ready, channel 3 | Ready, channel 4 |
| 1 s | Display channel 4→5 | Display, channel 5 | Prep, channel 6 | Prep, channel 7 | Ready, channel 4 |
| 1 s | Waiting | Ready, channel 5 | Prep, channel 6 | Prep, channel 7 | Prep, channel 8 |
| 1 s | Display channel 5→6 | Ready, channel 5 | Display, channel 6 | Prep, channel 7 | Prep, channel 8 |
| 1 s | Waiting | Prep, channel 9 | Ready, channel 6 | Prep, channel 7 | Prep, channel 8 |
| 1 s | Display channel 6→7 | Prep, channel 9 | Prep, channel 10 | Display, channel 7 | Prep, channel 8 |
| 1 s | Waiting | Prep, channel 9 | Prep, channel 10 | Ready, channel 7 | Prep, channel 8 |
| 1 s | Display channel 7→8 | Prep, channel 9 | Prep, channel 10 | Ready, channel 7 | Display, channel 8 |
| 1 s | Display channel 8→9 | Prep, channel 9 | Prep, channel 10 | Ready, channel 7 | Ready, channel 8 |
| etc. | | | | | |

| Period | State/Action | Tuner 1 | Tuner 2 | Tuner 3 | Tuner 4 |
|---|---|---|---|---|---|
| | | 103 | 104 | 105 | 106 |
| 41 | Initial state → 3 | Ready, channel 1 | Display channel 2 | Ready, channel 3 | Ready, channel 4 |
| 42 — 100 ms | Display channel 3→4 | Prep. channel 5 | Ready, channel 2 | Display channel 3 | Ready, channel 4 |
| 43 — 1.5 s | Forced wait | Prep. channel 5 | Prep. channel 6 | Ready, channel 3 | Ready, channel 4 |
| 44 — 1.5 s | Display channel 4→5 | Prep. channel 5 | Prep. channel 6 | Ready, channel 3 | Display channel 4 |
| 45 | Waiting | Prep. channel 5 ⊙ | Prep. channel 6 | Prep. channel 7 | Ready, channel 4 |
| 46 — 1.5 s | Display channel 5→6 | Display channel 5 | Ready, channel 6 | Prep. channel 7 | Ready, channel 4 |
| 47 | Waiting | Ready, channel 5 | Display channel 6 | Prep. channel 7 | Prep. channel 8 |
| 48 — 1 s | Display channel 6→7 | Prep. channel 9 | Ready, channel 6 | Prep. channel 7 | Prep. channel 8 |
| 49 | Waiting | Prep. channel 9 | Prep. channel 6 | Prep. channel 7 ⊙ | Prep. channel 8 |
| 50 — 1 s | Display channel 7→8 | Prep. channel 9 | Prep. channel 10 | Display channel 7 | Prep. channel 8 |
| 51 | Waiting | Prep. channel 9 | Prep. channel 10 | Ready, channel 7 | Prep. channel 8 ⊙ |
| 52 — 1 s | Display channel 8→9 | Prep. channel 9 | Prep. channel 10 | Ready, channel 7 | Display channel 8 |
| etc. | | | | | |

Fig. 3

METHOD TO CHANGE THE SERVICE OF A DIGITAL TELEVISION DECODER EQUIPPED WITH A PLURALITY OF TUNERS

CROSS-REFERENCE TO RELATED APPLICATIONS

This is the U.S. National Stage of PCT/EP2016/079539, filed Dec. 2, 2016, which in turn claims priority to French Application No. 1561835, filed Dec. 4, 2015, the entire contents of all applications are incorporated herein by reference in their entireties.

TECHNICAL FIELD OF THE INVENTION

The present invention concerns a method to change the service of a digital television decoder equipped with a plurality (i.e. at least two) tuners. The term "service" is understood to mean, traditionally, what users call a television channel, for example a channel broadcasting successive programmes one after another during the day. However, the services can be solely audio services or data services or other services.

The purpose of the invention is to improve a channel-switching time when a user of a digital television decoder makes a plurality of successive changes of service, where this succession of changes of service made by the user is rapid, and are typically separated by periods of less than one second. The expression "channel-switching time", or time to change service, refers to the period which elapses between a command being given to change the service by a user of a digital television decoder, for example by means of an appropriate remote control device, and the actual display of the desired service on the screen connected to the decoder in question.

The field of the invention is, in general, that of digital television decoders. For the sake of simplification, in the remainder of the document the term "decoder" will refer to a digital television decoder. In the field of digital television, digital television decoders are used, in particular, to access a set of television channels which are transmitted encrypted, and which are decrypted within the decoder.

The transmission means which transmit the television programmes to these decoders are either conventional air transmission means, or coaxial cables, or optical cables, or rebroadcasting satellites which serve a region, or alternatively the Internet network.

The invention is of interest for all types of digital decoder, whether decoders receiving a stream of signals which must be decoded by a satellite, or alternatively by TNT, or alternatively for IP decoders which receive the stream of signals to be decoded via the Internet network.

With a digital television equipped with a tuner, the change from a first television service to a second television service is generally a relatively slow operation. The decoder must successively:

adjust the tuner of the television decoder to the channel conveying the signals relating to the second television service;
  among these signals, identify packet headers of the second television service in order to synchronise with the data stream which corresponds to the second television service;
  recover and analyse description tables (PAT and PMT tables) of the various television services conveyed by the channel to which the tuner is adjusted, to determine which streams correspond to the second television service, since a channel in fact generally conveys the streams of several multiplexed television services;
  filter the incoming data to isolate the streams corresponding to the second television service;
  wait, in the filtered incoming data, for a start of a data packet of the GOP type (Group Of Picture) to be received. Indeed, in a video stream the images are encoded in a manner which makes reference to the adjacent images. It is therefore necessary to have already decoded the adjacent images in order to be able to decode certain images. The images are grouped into independent GOPs, meaning that an image of a GOP may depend on other images in the same GOP, but cannot depend on images from outside the GOP. When the decoder starts to receive the data of a television service this is generally data in the middle of a GOP, which cannot consequently be used, since the decoder does not have the data from the start of the GOP; it is then necessary to wait for the start of the next GOP to be able to start decoding the video of the new television service which the user wishes to access.

The negative consequence of the succession of these five operations is that a delay of the order of three seconds is observed between the time when the user presses a button of the remote control to change the service, and the moment when the new service is displayed on the screen.

TECHNOLOGICAL BACKGROUND OF THE INVENTION

If the decoder has several tuners it can receive several services simultaneously. It is then known in the state of the art to be able to configure a first tuner to receive and display (i.e. reproduce on a television screen) a first television service, whilst simultaneously configuring other tuners; configuration of these other tuners consists in performing the five operations described above to make a change of service in order to receive television services which may thereafter be displayed, although they are not displayed when the first television service is displayed; these other television services may then be displayed almost instantaneously (in less than one hundred milliseconds) when a user wishes to access them, since the work to prepare for the display, described above, has been performed while the tuner is being configured.

This solution does however pose a problem when the user changes service—in other words switches channel—several times in very rapid succession. In this case, indeed, irregular service-change times will be observed, and some service-change times may be of significant duration, of the order of three seconds.

Such a case is illustrated by means of FIG. 1, in which a first table has been represented illustrating the case of a digital decoder with four tuners, where rapid actions (of the order of one hundred milliseconds) by a user are observed, to change services.

In the table of FIG. 1 six columns have been represented:
  a first column 101 indicates time values elapsed between various actions performed by the decoder;
  a second column 102 indicates a visible state of the decoder and a possible pending action undertaken by the decoder;
  a third column 103 indicates the operation being performed with the first tuner (Tuner 1);
  a fourth column 104 indicates the operation being performed with the second tuner (Tuner 2);

a fifth column 105 indicates the operation being performed with the third tuner (Tuner 3);

a sixth column 106 indicates the operation being performed with the fourth tuner (Tuner 4).

Each tuner can have several states: it can either be the tuner allowing the channel (or service) to be displayed when reproducing on a screen, or be preparing another channel, by performing the various operations described above required for a change of service, or be ready to display another channel (when the operations to prepare for the change of service have already been performed). For each of the four tuners used in the represented example the number of the channels in question is shown in each table cell.

The states shown in column 102 correspond to what a user of the said decoder can see. When an initial state has finished (corresponding, for example, to the state of the decoder before the user starts their rapid service-change operations), these states can be either a state of display of a channel, or a state of waiting for display of a next channel which the user wishes to display. The wait state usually results in either a fixed displayed image, or a black screen.

The action indicated in column 102 is an action to change the channel, illustrated by the symbols "->x", where x refers to the channel number which the user wishes to display.

The first table thus illustrates a succession of states and of actions of different tuners, a visible state of the decoder completed by the actions requested by the user. The different lines of the first table correspond to a chronological progression observed to respond to the service-change requests made by the user.

The first table thus shows:

a first line 11 corresponding to the initial state. This initial state indicates the states of the different tuners when the user starts their rapid service-change operations. Since such operations have not occurred for a certain period (longer than three seconds), tuners 1, 3 and 4 are ready to display a channel immediately, and tuner 2 is assigned to display of a channel, in this case channel 2.

In the initial state the user sends an instruction to the decoder to change the service in order to show channel 3.

A second line 12 shows that channel 3 is displayed very rapidly—after approximately 100 ms—using tuner 3; tuner 1, which was ready to display another channel (channel 1) then starts the operations to prepare to change the service to a new channel, channel 5; indeed, it is considered, and this is the case in particular when the user uses the "P+" functions, to display the next channel, that there is less chance that channel 1 will shortly be selected by the user now that they have chosen channel 3. Tuner 2, which was used to display channel 2, remains in a state in which it is ready, almost instantaneously, to display channel 2 again, should the user cancel their latest decision to change service. In this described state the user sends a service-change order to display channel 4.

A third line 13 shows that channel 4 is displayed very rapidly—after approximately 100 ms—using tuner 4; tuner 2, which had stayed ready to display another channel (channel 2) then starts the operations to prepare to change the service to a new channel, channel 6; again, it is considered that there is less chance that channel 2 will shortly be selected by the user now that they have chosen channel 4. Tuner 3, which was used to display channel 3, remains in a state in which it is ready, almost instantaneously, to display channel 3 again, should the user cancel their latest decision to change service. In this described state the user sends a service-change order to display channel 5.

A fourth line 14 shows a wait state of the decoder; indeed, the user has manifested their wish to display channel 5, but tuner 1 started the operations to prepare for the change of service of channel 5 only at line 102, i.e. approximately only 200 ms before receiving the instruction to change to this channel 5. The operations to prepare for the change of service have thus not been able to be completed, and tuner 1 still requires approximately 2.8 seconds to be able to display channel 5, as can be seen on line 106. In the first table an asterisk shows the operations undertaken by one of the tuners blocking the display of a channel to be displayed. At the same time tuner 2 is finalising the service-change operations to display channel 6, and tuner 3 can undertake most of the operations required to change service to display channel 7 (since it has 2.8 seconds).

The operations of lines 11, 12, 13 and 14 are then repeated on lines 15, 16, 17 and 18, using the same mechanism, to display the next channels. The process can thus be repeated indefinitely.

In the illustrated example it is therefore observed that if good use is made of the presence of four tuners to improve the service-change time for the first two service operations, from the third channel-switching operation the service-change time is once again too long, compared to the service-change time for a decoder equipped with a single tuner.

GENERAL DESCRIPTION OF THE INVENTION

The method according to the invention proposes a solution to the problem which has been described. In the invention a solution is proposed to take advantage of the presence of several tuners in the digital television decoder in order to provide an optimised service-change time. The service-change time according to the invention is optimised in the sense that it is no longer again necessary, even after a large number of consecutive, rapid service-change operations, to wait for a relatively long period (of the order of three seconds) for the desired service change to occur.

To this end it is proposed in the invention that wait times are sometimes imposed before displaying certain services, even if the said services are ready to be displayed; the forced wait times enable the different tuners to prepare the service-change operations for channels which will then be able to be displayed at a later time without waiting for too long. These forced wait times are not lengthy—of the order of one second—which moreover provides a certain uniformity in the observed service-change times.

To this end, in the invention, a method is essentially proposed to change service within a digital television decoder, where the said digital decoder comprises a plurality of tuners, where each tuner of the plurality of tuners is designed to receive a stream of signals containing data relating to television services, where each tuner of the plurality of tuners is used for the purpose of a service-change operation (where the decoder may possibly comprise tuners other than those of the plurality of tuners mentioned here, for example tuners which might at least occasionally be used to download software to update the decoder), where the said method is characterised by the fact that it comprises the various steps consisting in:

Configuring each tuner of the plurality of tuners for the reception of a specific service; the expression "of a specific service" is understood to mean that, at a given instant, each tuner is configured (or alternatively is being configured when the implementation of the method according to the invention has started) for a service for which no other tuner is configured (or is being configured);

Reproducing, on a screen, a first service corresponding to the service for the reception of which a first tuner of the plurality of tuners has been configured;

Receiving, through the decoder, a first service-change command in order to display a second service for the reception of which a second tuner of the plurality of tuners has been configured;

Receiving, through the decoder, a second service-change command for the purpose of displaying a third service for the reception of which a third tuner of the plurality of tuners has been configured;

Applying a forced delay before displaying the second service and/or the third service. The term "forced delay" refers to a period which is imposed on the decoder for the display of a service in question, although the tuner configuration operations are completed, and would enable the service in question to be displayed instantaneously.

The method according to the invention may comprise, in addition to the main steps mentioned in the previous paragraph, one or more of the following additional characteristics:

the forced delay is applied for the display of the second service;

the forced delay is roughly equal to a value equal to T/K, where T refers to a habitual service-change period, and where K refers to an integer less than or equal to a number N of tuners of the plurality of tuners. The expression "roughly equal" refers to the fact that the forced delay value is within a range of values equal to the value T/K, to within around fifty percent. The habitual service-change period is the period observed in order to perform the five operations described to change service, i.e. approximately 3 seconds.

K is equal to N−1.

K is equal to N−2.

K is equal to N/2+1.

K is equal to N/2.

the forced delay is applied for the display of the third service, but is not applied for the display of the second service.

the forced delay is roughly equal to a value T/(N−2), where T refers to a habitual service-change period, and where N refers to the number of tuners of the plurality of tuners.

the forced delay is between 0.5 seconds and 1.5 seconds.

the method comprises the additional step consisting, after displaying the second service, and at least until the reception of the second service-change command, in keeping the first tuner configured for the reception of the first service.

The various additional characteristics of the method according to the invention, provided they are not mutually exclusive, are combined in all possible combinations to give different examples of implementation of the invention.

The present invention also relates to an electronic device of the digital television decoder type characterised by the fact that it is designed to implement the method according to any of the implementations of the invention.

Another aspect of the invention relates to a computer program product containing instructions which, when the program is executed by a computer, cause this computer to implement the steps of the method according to the invention. In particular, those skilled in the art will recognise that a digital television decoder is an example of a computer. This aspect of the invention therefore relates in particular to a computer program product containing instructions which, when the program is executed by a digital television decoder, cause this digital television decoder to implement the steps of the method according to the invention.

Another aspect of the invention relates to a computer-readable recording medium on which the computer program product according to the invention is recorded. This aspect of the invention relates in particular to a recording medium which is readable by a digital television decoder, on which medium the computer program product according to the invention is recorded.

The invention and its various applications will be better understood on reading the description which follows, and on examining the figures which accompany it.

BRIEF DESCRIPTION OF THE FIGURES

These are shown as an indication only, and are not restrictive of the invention in any way. The figures show:

in FIG. 1, previously described, a first table illustrating the use of four tuners in a digital television decoder to change service using a known method of the state of the art.

in FIG. 2, a second table illustrating a first example implementation of the method according to the invention;

in FIG. 3, a third table illustrating a second example implementation of the method according to the invention.

DESCRIPTION OF THE PREFERRED
EMBODIMENTS OF THE INVENTION

Unless otherwise stipulated, the various elements shown in several figures will have the same references. In particular, FIG. 2 and FIG. 3 represent respectively a second table 200 and a third table 300 with the same columns as the columns of table 1.

The various examples illustrate the case in which the decoder is equipped with four tuners, but in other examples the decoder is equipped with a different number of decoders, with a minimum of 2; the method according to the invention is of particularly great use if the number of tuners equipping the decoder is at least three.

In FIG. 2 a first example implementation of the method according to the invention has been represented, illustrated in the form of a second table organised on the same basis as the first table described in FIG. 1.

The second table thus illustrates a succession of states and actions of the different tuners, and a visible state of the decoder completed by the actions requested by the user in an example implementation of the method according to the invention. The different lines of the second table correspond to a chronological progression observed to respond to service-change requests made by the user according to this example implementation of the method according to the invention.

The second table thus shows:

a first line 21 corresponding to the initial state. This initial state indicates the states of the various tuners when the user starts their rapid service-change operations. As with the first table described, since such operations have not occurred for a certain period (longer than three seconds), tuners 1, 3 and 4 are ready to display a channel immediately, and tuner 2 is assigned to display of a channel, in this case channel 2. In the initial state the user sends an instruction to the decoder to change the service in order to show channel 3.

In this example implementation of the method according to the invention a forced wait, of one second in the example in question, is then imposed in a subsequent step (line 22). This forced wait is a period which is imposed on the decoder before it displays channel 3; the wait is called "forced" in the sense that channel 3 could be displayed almost instantaneously, since the information required for its display has been prepared by means of tuner 3. The forced wait enables the tuners which have started operating to prepare for a change of service to a third channel, in this case channel 5 by means of tuner 1, which was ready to display another channel (channel 1), to continue preparing the operations to change service to channel 5. Tuner 2, which was used to display the channel 2, remains in a state in which it is ready, almost instantaneously, to display channel 2 again, should the user cancel their latest decision to change service. Indeed, it is considered, and this is the case in particular when the user uses the "P+" functions, to display the next channel, that there is less chance that channel 1 will shortly be selected by the user now that they have chosen channel 3.

A third line 23 shows that channel 3 is displayed, after the forced wait time of the previous step by means of tuner 3; tuner 1 then continues the operations to prepare for the change of service to channel 5. In this described state the user sends a service-change order to display channel 4.

A fourth line 24 shows that a new forced wait of approximately one second is now in progress. This forced wait is another period which is imposed on the decoder before it displays channel 4. The forced wait enables the different tuners, in this case tuners 1 and 2, to continue or start the work to prepare to change service to a third channel, in this case channel 5 by means of tuner 1, and channel 6 by means of tuner 2. Tuner 3, which was used to display channel 3, remains in a state in which it is ready, almost instantaneously, to display channel 3 again, should the user cancel their latest decision to change service.

A fifth line 25 shows that channel 4 is then displayed, after the forced wait time of the previous step by means of tuner 4; tuner 1, or respectively tuner 2, then continues the operations to prepare for the change of service to channel 5, or respectively to channel 6. In this described state the user sends a service-change order to display channel 5

In a sixth line 26 the decoder must consequently wait, since tuner 5 has not finished completing the operations to prepare to change service to display channel 5. However, these preparatory operations have already made good progress since step 22, and the time required to finalise them is of the order of one second, i.e. substantially less than the 2.8 seconds which could be observed in the described example of the state of the art. At the same time, tuner 3 starts to prepare channel 7, tuner 2 continues to prepare channel 6, and tuner 4 keeps available the configuration completed for channel 4, for the same reasons as those given above, when information required to display channels 2 and 3 was kept.

Thus, in the invention, through the use of forced wait periods the observed wait times are harmonised for all future service changes; indeed, it is observed, for lines 27 to 33, that the wait time is in fact of the order of one second, which is now sufficient for the operations required to change service to be completed for each tuner.

Advantageously, in another implementation described by means of FIG. 3, the decoder can omit the additional period for the first change of channel. The user in fact very frequently makes only a single service-change operation, for example by pressing only once the "P+" button of their remote control, to go to the next channel; the user often waits a certain time before pressing the "P+" button again.

In this case it is advantageous to make the service change immediately after the decoder receives the first service-change command: the tuners which are unused when displaying the selected channel then have the time to prepare during the period between the possible successive presses of buttons ordering changes of service. Conversely, if the user presses the service-change buttons in rapid succession, and if the decoder has executed the first service change without a forced wait, i.e. immediately, it is then advantageous to increase the forced wait period for the next service changes.

Such an example of an implementation of the method according to the invention is illustrated by means of the third table shown in FIG. 3, which is organised on the same basis as the tables of FIGS. 1 and 2.

The third table thus illustrates a succession of states and actions of the different tuners, and a visible state of the decoder completed by the actions requested by the user in an example implementation of the method according to the invention. The different lines of the second table correspond to a chronological progression observed to respond to service-change requests made by the user according to this example implementation of the method according to the invention.

The third table thus shows:

A first line 41 corresponding to the initial state. This initial state indicates the states of the various tuners when the user starts their rapid service-change operations. As with the first described table and the second described table, since such operations have not occurred for a certain period (longer than three seconds), tuners 1, 3 and 4 are ready to display a channel immediately, and tuner 2 is assigned to display of a channel, in this case channel 2. In the initial state the user sends an instruction to the decoder to change the service in order to show channel 3.

A second line 42 shows that channel 3 is displayed very rapidly—after approximately 100 ms—using tuner 3; tuner 1, which was ready to display another channel (channel 1) then starts the operations to prepare to change the service to a new channel, channel 5, for the reasons explained in particular when describing table 1. Tuner 2, which was used to display channel 2, remains in a state in which it is ready, almost instantaneously, to display channel 2 again, as was the case in the first table described.

In this example implementation of the method according to the invention a forced wait, of approximately 1.5 seconds in the example in question, is then imposed in a subsequent step (line 43). This forced wait is a period which is imposed on the decoder before it displays channel 4; the wait is called "forced" in the sense that channel 4 could be displayed almost instantaneously, since the information required for its display has been prepared by means of tuner 4. The forced wait enables the tuners which have started preparing a change of service to a third channel to continue preparing for the operations to change service to the channels which are assigned to them.

A fourth line 44 indicates that channel 4 is displayed, after the forced wait time of the previous step by means of tuner 3; tuner 1 then continues the operations to prepare to change service to channel 5, and tuner 2 that of channel 6. In this described state the user sends a service-change order to display channel 5.

A fifth line 45 indicates that a wait time is then necessary in order for tuner 1 to finish preparing channel 5. The required wait time is then of the order of 1.5 seconds, since the preparation of channel 5 started at second line 42, and a forced wait is thus not necessary.

A sixth line 46 shows that channel 5 is then displayed, after the unforced wait time of the previous step by means of tuner 1; tuner 2, or respectively tuner 3, then continues the operations to prepare for the change of service to channel 6, or respectively to channel 7. In this described state the user sends a service-change order to display channel 6.

In this example implementation of the method according to the invention a new forced wait, of approximately 1 second, is then imposed in a subsequent step (line 47). This forced wait is a period which is imposed on the decoder before it displays channel 6; the wait is called "forced" in the sense that channel 6 could be displayed almost instantaneously, since the information required for its display has been prepared by means of tuner 2. The forced wait enables the tuners which have started preparing a change of service to a third channel to continue preparing for the operations to change service to the channels which are assigned to them.

The process to change service can then follow a regular rhythm, comparable to that of the second table, with service-change times of the order of 1 second in lines 48 to 52.

Thus, in the invention, through the use of forced wait periods, but giving priority to rapidity of a first change of service, the observed wait times are harmonised for all future service changes.

Advantageously, in the invention, it is proposed that the applied forced delays should be roughly equal to a value equal to T/(N−1), where T refers to a habitual service-change period (typically 3 ms), and where N refers to the number of tuners of the plurality of tuners present in the decoder, when priority is not given to the first change of service.

When priority is given to the first change of service, i.e. when it is performed almost instantaneously on reception of the service-change command, the forced delay is advantageously roughly equal to a value equal to T/(N−2).

In the various examples described the channels are designated by incrementing numbers. In practice the different channels prepared by the different tuners for possible display can, for example, be selected from a list of the users favourite channels, or alternatively be channels which will follow one another by successive, rapid pressing on a button of the decoders remote control, in particular the "P+" button or the "P−" button, which enable the user to step forward, or respectively backward, through a list of channels ordered by a television operator, or also channels with direct access, accessible by a dedicated button of the remote control, or alternatively to channels in a "history", which the user has viewed recently, which can be accessed by pressing a "return" button of the remote control.

The invention claimed is:

1. A method to change service within a digital television decoder,
wherein the digital decoder comprises a plurality of tuners, wherein each tuner of the plurality of tuners is adapted to receive a stream of signals comprising data relating to television services, wherein each tuner of the plurality of tuners is used for the purpose of a service-change operation, the method comprising:
configuring each tuner of the plurality of tuners for the reception of a specific service;
reproducing, on a screen, a first service corresponding to the service for the reception of which a first tuner of the plurality of tuners has been configured;
receiving, through the decoder, a first service-change command in order to display a second service for the reception of which a second tuner of the plurality of tuners has been configured;
receiving, through the decoder, a second service-change command for the purpose of displaying a third service for the reception of which a third tuner of the plurality of tuners has been configured;
applying a forced wait time before displaying the second service and/or the third service if the second service and/or the third service can be displayed almost instantaneously, wherein the forced wait time is roughly equal to a value equal to T/K, wherein T refers to a habitual service-change period, and wherein K refers to an integer less than or equal to a number N of tuners of the plurality of tuners.

2. The method according to claim 1, wherein the forced wait time is applied for the display of the second service.

3. The method according to claim 1, wherein K takes one of the following values: N−1, N−2, N/2+1, N/2.

4. The method according to claim 1, wherein the forced wait time is applied for the display of the third service, but is not applied for the display of the second service.

5. The method according to claim 4, wherein the forced wait time is roughly equal to a value T/(N−2), wherein T refers to a habitual service-change period, and wherein N refers to the number of tuners of the plurality of tuners.

6. The method according to claim 1, wherein the forced wait time is between 0.5 seconds and 1.5 seconds.

7. The method according to claim 1, further comprising, after displaying the second service and at least until reception of the second service-change command, keeping the first tuner configured for the reception of the first service.

8. A non-transitory computer-readable recording medium comprising instructions for implementing the steps of the method according to claim 1.

9. A digital television decoder, comprising a non-transitory computer-readable recording medium comprising instructions for implementing the steps of the method according to claim 1.

10. The method according to claim 1, wherein, when the second tuner of the plurality of tuners has been configured, the digital television decoder is adapted to display said second service within a first period of time after receiving the first service-change command, and
wherein, upon receiving the first service-change command to display the second service, the forced wait time is applied to the television decoder before displaying the second service, the forced wait time being such that a first display time for displaying the second service on the screen is greater than said first period of time.

11. The method according to claim 10, wherein, when the third tuner of the plurality of tuners has been configured, the digital television decoder is adapted to display said third service within a second period of time after receiving the second service-change command, and wherein, upon receiving the second service-change command to display the third service, the forced wait time is applied to the television decoder before displaying the third service, the forced wait time being such that a second display time for displaying the third service on the screen is greater than said second period of time.

12. The method according to claim 11, wherein the forced wait time applied to the television decoder before displaying the second service has a same duration as the forced wait time applied to the television decoder before displaying the third service.

* * * * *